(12) United States Patent
Medel Cabello

(10) Patent No.: US 11,819,046 B2
(45) Date of Patent: Nov. 21, 2023

(54) JUICING HEAD

(71) Applicant: Zumex Group, S.A., Valencia (ES)

(72) Inventor: Rafael Medel Cabello, Saragossa (ES)

(73) Assignee: Zumex Group, S.A., Valencia (ES)

( * ) Notice: Subject to any disclaimer, the term of this patent is extended or adjusted under 35 U.S.C. 154(b) by 621 days.

(21) Appl. No.: 16/635,419

(22) PCT Filed: Jul. 23, 2018

(86) PCT No.: PCT/EP2018/069876
§ 371 (c)(1),
(2) Date: Jan. 30, 2020

(87) PCT Pub. No.: WO2019/025215
PCT Pub. Date: Feb. 7, 2019

(65) Prior Publication Data
US 2020/0288763 A1    Sep. 17, 2020

(30) Foreign Application Priority Data

Jul. 31, 2017   (ES) .............................. ES201730997

(51) Int. Cl.
*A23N 1/00*   (2006.01)
*A47J 19/02*   (2006.01)
*A47J 19/06*   (2006.01)

(52) U.S. Cl.
CPC ............ *A23N 1/003* (2013.01); *A47J 19/023* (2018.08); *A47J 19/06* (2013.01)

(58) Field of Classification Search
CPC .. B30B 9/20; B30B 9/202; A47J 19/02; A47J 19/023; A47J 19/06; A23N 1/003
See application file for complete search history.

(56) References Cited

U.S. PATENT DOCUMENTS

| | | | | |
|---|---|---|---|---|
| 2,630,849 | A * | 3/1953 | Williams | A23N 1/003 99/504 |
| 2,707,981 | A * | 5/1955 | Trainor | A23N 1/003 99/507 |
| 4,526,093 | A * | 7/1985 | Fogerson | A23N 15/00 426/481 |

FOREIGN PATENT DOCUMENTS

| | | | | |
|---|---|---|---|---|
| DE | | 4305828 A1 * | 10/1993 | A23N 1/003 |
| WO | WO-2010077354 A1 * | | 7/2010 | A23N 1/003 |

OTHER PUBLICATIONS

Translation of DE-4305828 (Year: 1993).*

* cited by examiner

*Primary Examiner* — Bobby Yeonjin Kim
(74) *Attorney, Agent, or Firm* — Vedder Price P.C.

(57) ABSTRACT

Improved juicing head of the type with juicing heads present in juicing systems, where the fruit to juice is housed in a recess of a female element and is guided to meet the head of a male element that is temporarily inserted in the recess, pressing the fruit and extracting the juice, wherein the head comprises ribs on its surface, said ribs arranged transverse to the direction of motion of the head.

8 Claims, 3 Drawing Sheets

4.A  4.B  4.C

JUICING HEAD

This application is a national phase stage 371 of International No. PCT/EP18/69876, filed on Jul. 23, 2018, which published as PCT Publication No. WO2019/025215 on Feb. 7, 2019, which claims priority from and the benefit of Spain Application P201730997 filed on Jul. 31, 2017.

As its name indicates, the invention relates to a juicing head that is provided with a specific geometry to optimise juicing processes in machines in which the juicing process takes place when a portion of fruit is introduced in a recess such that, at a later time, a juicing head is inserted in the same recess occupying said recess temporarily, thereby pressing the fruit portion and extracting the juice.

In general, although not uniquely, this type of squeezer combines the action of two elements rotating in synchrony and in opposite senses, where the female element presents the recess or recesses that receive the fruit portion while the male element has the head or headers that occupy temporarily the recesses, pressing the fruit to obtain the juice.

There is also another type of juicing machines in which the head is fixed and the element comprising the recess moves towards the head.

The head is generally essentially spherical in shape to favour adjustment to the fruit and aid in the mechanics of the juicing.

The proposed head comprises areas where the head radius has been increased to generate deformations or ribs that improve the juicing process.

The invention belongs to the field of the art of juicing machines.

BACKGROUND OF THE INVENTION

Juicing devices have been known for some time, among which citrus fruit juicers are particularly common.

For domestic use, juicers commonly comprise a head with a pointed longitudinal cross section, coaxial to the drive shaft and which rotates about itself, this head presenting a surface with ribs that in general meet at the apex and extend along the sides either perpendicular to the base or obliquely.

In this type of juicer, the user places a portion of fruit on the head and exerts some pressure on the fruit, which together with the rotation of the head causes the juicing.

An example of this type of device can be found in Spanish patent ES0342448 and cited as an example of a head for this type of devices is Utility Model ES0173641U.

In the field of restaurants and industry, it is more common to use juicers that perform juicing by means of associated male and female drums, turning in synchrony and in opposite senses, where the female drum comprises recesses on the sides thereof that receive a fruit portion to be juiced that will turn with the drum and be taken to meet the heads provided in the male drum, which are inserted in the recess and occupy same temporarily, pressing the fruit in order to extract the juice.

Some examples of this type of machine are, among others:

Patent ES2008438 which presents to male drums and two female drums arranged on parallel shafts.

Patent ES2284294 which presents a single male drum and a single female drum arranged on parallel shafts.

Patent ES2527974 which presents a juicing system where the male and female drums are arranged on common shafts.

However, to allow the head to transit through the recess there must be a certain clearance between said recess and the head, such that depending on the type of fruit to squeeze and the thickness of its skin there may be parts that are not squeezed in the areas closer to the skin.

Other squeezing devices are known as for example WO2005/041732, CN106490952 or U.S. Pat. No. 2,707,981, all of them having heads that rotate on its own axis. In the invention proposed heads do not need to do any rotatory movement on its own axis, which suponse less number of pieces and a stronger device. Are also known devices as ones referred in U.S. Pat. No. 2,630,849 and BE713716 both related to squeezing devices with heads with revolving movement around the axis of the male element but with no ribs on its heads. They include some slots on its heads in order to let son external devices to penetrate in the heads. In U.S. Pat. No. 2,630,849 the external device is a group of strings of metal that maintain the fruit on its position during the squeezing operation and in the case of BE713716 the external device is a member (palette) that penetrates in the squeezing head in order to remove de rests of fruit after de squeezing operation. In both patents those slots are arranged in the same direction of the movement of the heads.

DESCRIPTION OF THE INVENTION

To solve the drawback described above, a head is proposed with an increased radius at a number of points causing a deformation of the surface thereof in the form of a ribbing, such that when the recess is occupied said ribbing on one hand is placed snugly against the wall of the recess, optimising the juicing by pressure, and on the other hand due to its shape and movement acts as a scraper, helping to extract the juice that may be left in the pulp attached to the skin, while also helping to separate the pulp from the skin.

Another advantage of this type of head with ribs is that they can help contribute to directing the juice, reducing splashing.

These ribs are arranged transverse to the direction of motion of the head, understanding as "transverse to the direction of motion of the head" any position of the ribs other than that perpendicular to the axis of rotation of the male element, generally a drum, around which the head orbits.

This orbiting movement of the head is around the rotation shaft of the male element.

In one possible embodiment, the ribs are arranged perpendicular to the direction of motion of the head, parallel to the rotation shaft of the male element about which the head orbits.

The ribs are arranged around the surface of the head and can occupy all of the surface or only part of it.

The ribbing cross section can have many different shapes, although it has been shown that a good result is obtained with a trapezoidal cross section with smooth edges, as it allows a simple cleaning without a reduction in effectiveness.

With regard to the size of the ribs, this will depend on the size of the machine, which depends on the size of the fruit to juice. For a machine used to juice medium-sized citrus fruits such as oranges, tangerines, lemons or even grapefruit or limes, the height of said ribs will be between 0.2 mm and 12 mm, preferably between 0.4 mm and 0.6 mm. Specifically, a height of 0.5 mm has been tested with excellent results.

In one possible embodiment, albeit not the only one, the ribs describe a continuous straight line adapted to the spherical shape of the head as parallels or meridians, although there is no reason why the lines can be discontinuous or for the ribs to adopt shapes other than straight lines, such as small waves or any other arrangement.

In some of the tests performed the head has been provided with two ribs on the anterior part and another two ribs on the posterior part, leaving the cupola free, understanding as the anterior part that which is more forward in the direction of motion of the header and as posterior that which is more rearward, although other embodiments are possible where there can be a different number of ribs and an also different distribution.

BRIEF DESCRIPTION OF THE FIGURES

FIG. 4A shows the head at a time in the sequence in which the head, in its synchronous rotation with the female element, is about to reach the maximum occupation point of the recess; FIG. 4B shows the moment of maximum occupation of the head in the recess; and FIG. 4C shows the moment at which the head starts exiting the recess as both the female element and the male element continue revolving.

DESCRIPTION OF AN EMBODIMENT OF THE INVENTION

Figure 1:
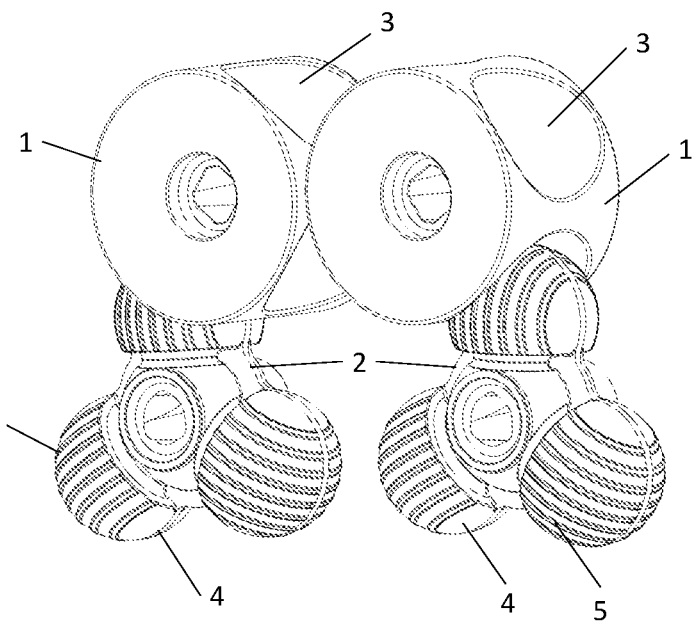
FIG. 1 shows the invention embodied as a juicing system of the type comprising two female elements and two male elements, in this case drums, arranged on shafts parallel to each other, although to simplify the figure only the female elements (1) and the male elements (2) are shown, the recesses (3)—on the sides of the female elements—meant to house in them the portion of fruit to be juiced—not shown in the figure—where due to the rotation of the female elements the fruit moves towards the heads (4) of the male elements which have a series of ribs (5) arranged transverse to the direction of motion of the head and arranged parallel to each other on the entire surface of the head.
Figure 2:
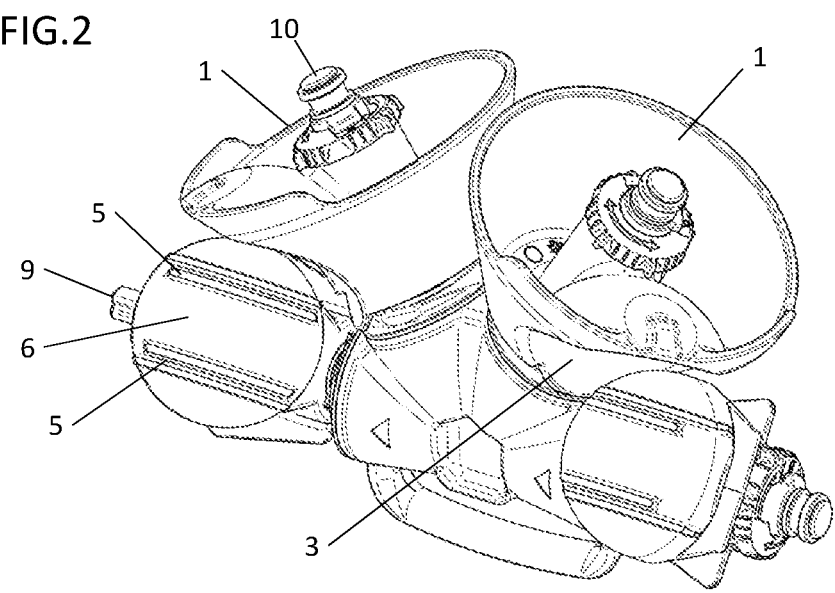
FIG. 2 uses the same references as FIG. 1 for the same elements, although the shapes thereof are different as these are different juicing systems, since this figure shows an embodiment of the invention of a juicing system where the rotation shafts of the male elements (9) and female elements (10) are not parallel but instead coincide, the female elements (1) having a frustoconical shape with the recesses (3) on their sides and the male elements (2) having a single head (4), in this case presenting two groups of ribs (5) each one comprising two lines and arranged on the anterior and posterior part of the head, leaving the cupola (6) thereof free. It can be seen that the ribs (5) are parallel to the rotation shaft (9) of the male element, in this case a drum, the head orbiting about said shaft in the case of the machine represented in the figure.
Figure 3:
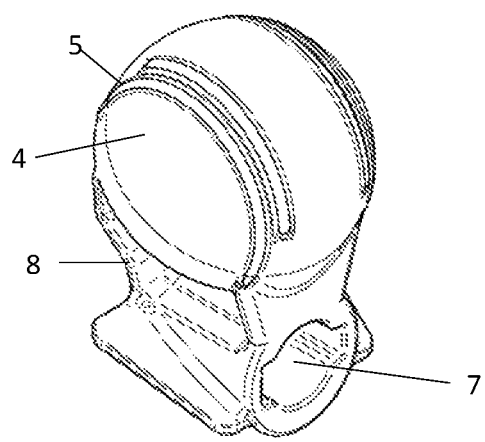
FIG. 3 shows the male element of a squeezing system as that of FIG. 2 showing the housing (7) of the rotation shaft—not shown—with respect to which the head (4) describes its revolving motion, the head and the shaft joined at the base of the head (8), also showing the ribs (5) that protrude from the surface of the head.
Figure 4:
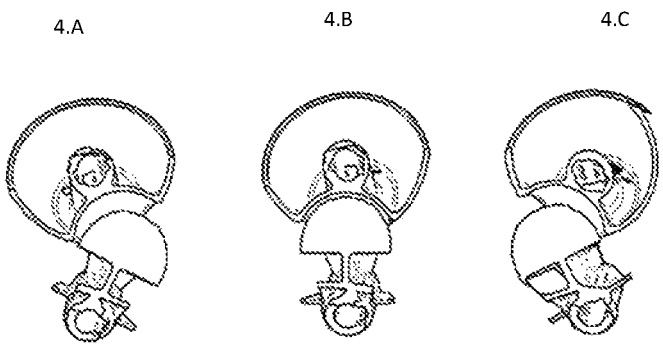
FIG. 4 shows a sequence of the passage of the head by the central part of the recess of the female element in a juicing system such as that shown in FIG. 2, although only one female element and one male element are shown, in cross section.
Figure 5:
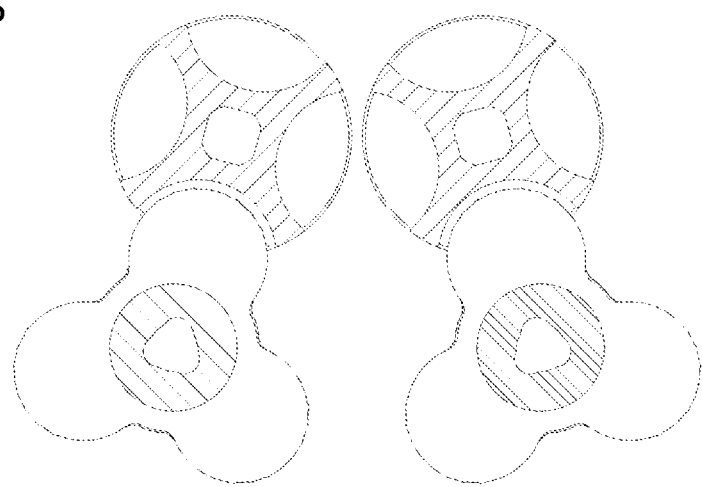
FIG. 5 shows a cross section of a juicing unit such as that of FIG. 1 in an embodiment where each male element comprises three heads and each female element comprises four recesses.

An embodiment of the invention is described below in a non-limiting sense and for purposes of illustration only.

The invention relates to an improved juicing head of the type with juicing heads present in juicing systems where the fruit or portion of fruit to juice is housed in a recess (3) of a female element (1) and is guided by the rotation of said female element to meet a head (4) of a male element, which also rotates, that is inserted in the recess filling it, pressing the fruit and extracting the juice.

In the head (4) a number of ribs (5) are arranged transverse to the direction of motion of the head, specifically parallel to the rotation shaft (9) of the male element.

The ribs are distributed around the entire surface of the head parallel to each other.

The ribs (4) have a trapezoidal cross section with smooth angles, to facilitate cleaning thereof, and a height of 0.5 millimetres.

Two factors are present in the juicing of the fruit according to the head of the invention: on one hand, the pressure exerted by the head, which by itself extracts a large part of the juice; and on the other hand the scraping by the ribbing, which helps to extract the part of the juice still in the fruit as the ribs further compress the fruit against the recess and, due to their shape, detach the pulp remains adhered to the skin, while due to their smooth edges do not rip the skin, thereby preventing essential oils contained in the skin alveoli from falling into the juice, which could give the juice a bitter taste.

The invention claimed is:

1. A juicing machine comprising: a juicing head including a female element (1) and a male element (2), wherein the female element (1) includes a recess (3) defined therein and a female rotation shaft (10), wherein the male element (2) includes a male rotation shaft (9) and a head (4) disposed at a distal end of a radial extension from the male rotation shaft (9) wherein the head (4) is non-rotatable with respect to the radial extension, and a fruit or a portion of the fruit to juice disposed in the recess (3) defined in the female element (1), wherein the female rotation shaft (10) and the male rotation shaft (9) are configured in a fixed disposition to one another, and wherein when the male element (2) is moved about the male rotation shaft (9) the head (4) orbitally moves about the male rotation shaft (9), and wherein the head (4) includes ribs (5) extending from a surface of the head (4) that are disposed in an orientation transverse to the movement of the male element (2), such that when the male element (2) and the female element (1) are moved synchronously in opposite directions the head (4) is inserted temporarily into the recess (3) to press the fruit and extracting the juice.

2. The juicing machine according to claim 1, wherein a height of the ribs (5) is between 0.2 and 12 millimeters.

3. The juicing machine according to claim 1, wherein a height of the ribs (5) is between 0.4 and 0.6 millimeters.

4. The juicing machine according to claim 1, wherein a height of the ribs (5) is 0.5 millimeters.

5. The juicing head according to claim 1, wherein the ribs have a trapezoidal cross section.

6. The juicing machine according to claim 1, wherein a cross sectional angle of the ribs is smoothed.

7. The juicing machine according to claim 1, wherein the ribs are disposed on an anterior portion and a posterior portion of the head (4), leaving a cupola (6) disposed between the anterior portion and the posterior portion free of any ribs (5).

8. The juicing head according to claim 1, wherein the ribs are disposed in a parallel orientation.

* * * * *